Nov. 6, 1934. J. H. HALL ET AL 1,979,686
METAL SOCKET, BUSH, FERRULE, RIVET, AND THE LIKE
Filed Nov. 12, 1930
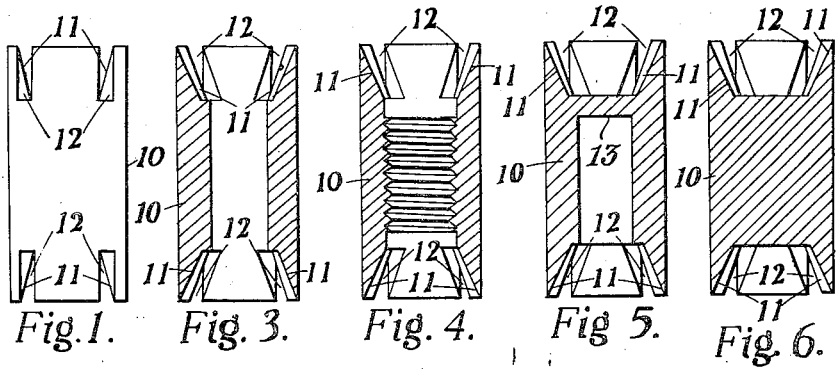
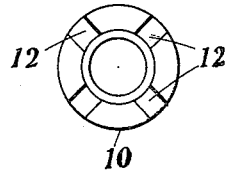
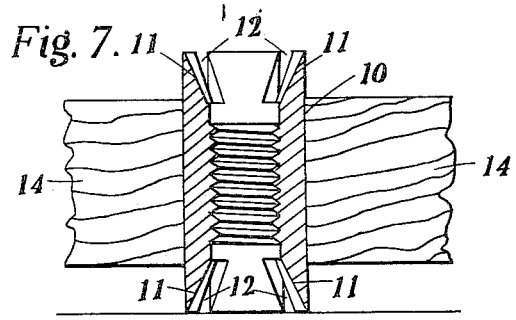
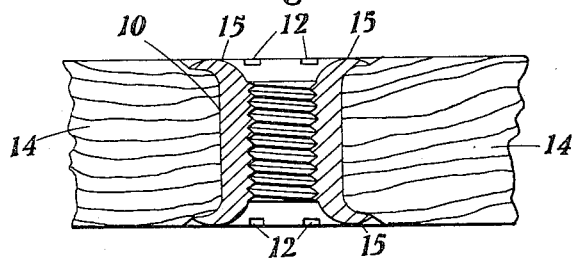
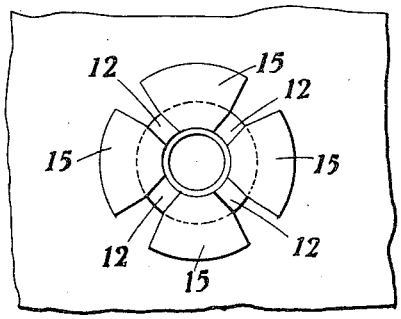
INVENTOR
JAMES HARRY HALL
AND SYDNEY HALL
BY Victor D. Borst
ATTORNEY Patented Nov. 6, 1934

1,979,686

UNITED STATES PATENT OFFICE 1,979,686

METAL SOCKET, BUSH, FERRULE, RIVET, AND THE LIKE

James Harry Hall and Sydney Hall, Ashton-under-Lyne, England, assignors to Hall & Kay, Limited, Ashton-under-Lyne, England Application November 12, 1930, Serial No. 495,112
In Great Britain November 13, 1929

2 Claims. (Cl. 85—40)

This invention has reference to metal sockets, bushes, ferrules, rivets and the like articles, and it has for its object to provide an improved socket, bush, ferrule, rivet or the like especially applicable for securing in relatively soft materials, such as e. g. lead, wood or leather, for the attachment of parts or members thereto, or for securing together two or more thicknesses of such materials. A particular object of the invention is to provide an improved screw socket for securing in a panel of wood to receive a screw threaded part or member and both ends of which will lie flush with the panel in which the socket is secured.

According to this invention, a socket, bush, ferrule, rivet or the like is made hollow at both ends and internally chamfered or bevelled thereat so that when the ends are upset, such as by hammering, they spread outwards. The hollow chamfered or bevelled ends are preferably divided by saw cuts into a plurality of parts which when the ends are upset form claws which can be driven into soft materials such as lead, wood or leather.

In the accompanying drawing Fig. 1 is an elevation, Fig. 2 is a plan and Fig. 3 is a longitudinal section of one form of device in accordance with the invention, Figs. 4, 5 and 6 are longitudinal sections of further forms of device in accordance with the invention. Figs. 7 and 8 are sections and Fig. 9 is a plan illustrating a device of the form shown in Fig. 4, fixed in a piece of wood. In the drawing like numerals of reference indicate like parts.

Referring to the drawing, the device illustrated in Figs. 1, 2 and 3 consists of a member 10 having a plain or smooth through bore and its ends internally chamfered or bevelled as at 11 to a wedge shape shown as having a sharp edge at the end, and with such ends divided by straight longitudinal slits or saw cuts 12 into a plurality of equal parts, shown as four in number, of a length equal to that of the chamfer or bevel. Such a device may be used as a socket, bush or ferrule for mounting in wood or other relatively soft materials, or as a tubular rivet for securing together two or more thicknesses of such materials.

The device shown in Fig. 4 has its bore screw-threaded to receive a complementary screw-threaded part. The screw thread formed in the bore of the member 10 terminates a little distance inward from the chamfers or bevels 11 and saw cuts 12, in a smooth larger bore portion which is shown as enlarged only to the extent of the depth of the screw thread, so that when the ends of the member are upset, as hereinafter explained, the thread will not be damaged.

The device illustrated in Fig. 5 is provided with a bore which is closed or blanked as at 13 near one end, such a device being suitable for use as a socket to receive a complementary part or as a rivet. Or the bore may be provided with a screw thread to receive a complementary screw-threaded part.

Fig. 6 illustrates a device for use as a rivet. In this device only the ends of the member 10 are formed hollow, the body of the member between the ends being solid.

In fitting any of the devices described, the device is conveniently inserted into a hole, or aligned holes, in the piece or pieces of wood or other material 14 and placed on an anvil or other suitable base as illustrated in Fig. 7 and the ends of the member 10 are upset by hammering. When the ends of the member are upset the divided parts spread outwards forming claws 15 which can be driven into the material 14 flush with the faces of the same, as shown in Figs. 8 and 9.

The external cross section of the member 10 is preferably round but it may be of square or any other desired shape to prevent rotation of the device, though in most cases the claws 15 will effectually prevent rotation.

In cases where the member 10 is formed with a bore which is not provided with a screw thread the cross-section of the bore may be round, or of square or other desired shape to receive a part of like cross-section.

What we claim as our invention and desire to secure by Letters Patent is:—

1. A one-piece tubular metal member usable as a socket, bush, ferrule, rivet or the like, comprising a body portion having longitudinally through it a cylindrical bore the middle portion only of which is screw threaded and the end portions of which are unthreaded and enlarged at least to the extent of the depth of the screw thread, the said tubular member having at each end thereof an end portion which flares outwardly from the adjacent end of the enlarged bore portion, the said flaring end portion only being provided with a plurality of longitudinal slits of the same depth as the flaring portion and dividing this flaring portion only into a plurality of equal parts which at each end of the tubular member may be spread outwardly to form a peripherally divided retaining head.

2. The invention defined in claim 1, in which each of the said divided parts is substantially of a smooth wedge shape terminating at the end in a substantially sharp edge.

JAMES HARRY HALL.
SYDNEY HALL.